United States Patent [19]
Dujari et al.

[11] Patent Number: 5,955,569
[45] Date of Patent: Sep. 21, 1999

[54] METHOD FOR SOLID PHASE POLYMERIZATION

[75] Inventors: Ramdas Dujari; Gregory D. Cramer, both of Seaford; David Neil Marks, Newark, all of Del.

[73] Assignee: E.I. du Pont de Nemours and Company, Wilmington, Del.

[21] Appl. No.: 08/757,310

[22] Filed: Nov. 27, 1996

[51] Int. Cl.$^6$ .................. C08G 69/46; C08G 69/48
[52] U.S. Cl. .................. 528/480; 528/310; 528/313; 528/323; 528/336; 528/487; 528/492; 528/501; 528/502 C; 528/503; 525/419; 525/420
[58] Field of Search .................. 528/310, 313, 528/323, 336, 492, 487, 480, 503, 501, 502 C; 525/420, 419

[56] References Cited

U.S. PATENT DOCUMENTS

| | | | |
|---|---|---|---|
| 2,172,374 | 11/1939 | Flory | 260/561 |
| 3,015,651 | 1/1962 | Kjellmark | 260/78 |
| 3,031,433 | 4/1962 | Monroe | 260/78 |
| 3,254,429 | 6/1966 | Livingston | 34/168 |
| 3,390,134 | 6/1968 | Kibler | 260/75 |
| 3,480,596 | 11/1969 | Simons | 260/78 |
| 3,562,206 | 2/1971 | Silverman et al. | 260/45.7 |
| 3,634,359 | 1/1972 | Breitschaft et al. | 260/75 M |
| 3,657,388 | 4/1972 | Schweitzer et al. | 260/873 |
| 3,821,171 | 6/1974 | Beaton | 528/310 |
| 4,223,128 | 9/1980 | Halek et al. | 528/481 |
| 4,254,253 | 3/1981 | Brent, Jr. et al. | 528/272 |
| 4,568,736 | 2/1986 | Curatolo et al. | 528/313 |
| 4,591,468 | 5/1986 | Follows et al. | 264/40.1 |
| 4,609,721 | 9/1986 | Kirshenbaum et al. | 528/285 |
| 4,952,345 | 8/1990 | Roa et al. | 264/40.6 |
| 5,073,453 | 12/1991 | Knorr | 428/373 |
| 5,116,919 | 5/1992 | Buzinkai et al. | 525/420 |
| 5,140,098 | 8/1992 | Pipper et al. | 525/420 |
| 5,234,644 | 8/1993 | Schutze et al. | 264/101 |
| 5,237,755 | 8/1993 | Lowe | 34/1 |
| 5,292,865 | 3/1994 | Kerps et al. | 528/492 |
| 5,434,223 | 7/1995 | Scheetz et al. | 525/432 |
| 5,461,141 | 10/1995 | Sheetz | 528/481 |
| 5,543,495 | 8/1996 | Anolick et al. | 528/480 |

FOREIGN PATENT DOCUMENTS

| | | | |
|---|---|---|---|
| 0 002 717 A1 | 12/1978 | European Pat. Off. | C08G 69/30 |
| WO 94/21711 | 9/1994 | WIPO | C08G 69/30 |

OTHER PUBLICATIONS

Doub et al.,, How to dry resisns for optimum parts and trouble–free processing, *Plasti Engineering*, Jun. 1983.

Srinivansan et al., Solid–State Polymerization Vis–a–Vis Fiber Formation of Step–Growth Polymers.I. Results from a Study of Nylon 66, *Journal of Applied Science*, vol. 53, pp. 1731–1743 (1994) The month in the dat of publication is not available.

John Wiley & Sons, Inc., Encyclopedia of Industrial Chemical Analysis, 17, 293–294, 1995 The month in the date of publication is not available.

*Primary Examiner*—P. Hampton-Hightower

[57] ABSTRACT

An improved method for increasing the relative viscosity and molecular weight of a polyamide polymer (such as nylon 6,6, nylon 6, and the like) while in the solid state involving the use of a phosphorus-containing catalyst (such as 2(2'-pyridyl) ethyl phosphonic acid or the like) in combination with an oxygen free gas characterized by a low dew point (typically below 30° C. and preferably below –30° C.). The combination of affording commercial operation at greater through put at lower temperature. Such a process is of particular value during the production of terpolyamide and multipolyamide polymer intended for use in colored nylon fiber manufacture.

6 Claims, 4 Drawing Sheets

METHOD FOR SOLID PHASE POLYMERIZATION

BACKGROUND OF THE INVENTION

1. Field of the Invention:

The present invention relates to a method of increasing the relative viscosity, RV, of a polyamide polymer while in the solid state. More specifically but not by way of limitation, the invention relates to an improved method for solid phase polymerization of polyamide polymer (e.g., nylon 6,6) wherein phosphorus catalyst-containing polyamide low RV moist pellets or the like are treated with a low dew point (typically below 30° C.) drying gas such as to promote a rapid increase in RV.

2. Description of Related Art:

In conventional solid phase polymerization, SPP, (see for example U.S. Pat No. 3,821,171) wherein commercial quantities of polyamide polymer are treated with high dew point (e.g., 10° C. to 50° C.) drying gas with or without the use of catalyst (such as phosphoric acid, phenyl phosphinic acid and sodium hypophosphite), high temperatures ( e.g., above 140° C.) and long hold up time (of 8 hours or greater) are required to raise RV of incoming pellets and thus produce product of desired molecular weight to be typically remelted in an extruder and spun to form fiber. In addition to the higher investment and cost associated with the SPP vessel, the long hold up tine results in high inventory, which in turn makes it difficult to transition to new products. This is especially true when the new product requires a different temperature set point on the circulating gas in the SPP unit because the new product requires a different throughput or a different RV relative to the old product. Water or steam injected in the SPP unit acts very slowly and it often takes more than one hour to adjust the RV at the spinneret. Also, at high temperatures (typically above 140° C.) cyclic oligomers evolve from nylon 6,6 pellets and then recondense on the cooler surfaces, thus requiring periodic overhaul of the SPP vessel and piping. Oxidative degradation is also higher at the high SPP temperatures.

SUMMARY OF THE INVENTION

In view of the above problems it has been discovered that the use of an ultra dry gas characterized by a dew point below 30° C. in combination with a phosphorus containing SPP catalyst leads to markedly increased solid state polymerization rates at significantly lower reaction temperatures. Faster reaction kinetics at lower reaction temperatures leads to employment of smaller SPP reactor vessels, reduced reactor inventory/residence times and/or greater through put. This in turn results in lower equipment costs, quicker transition and less waste associated with changes from one commercial grade of product to another, reduced unwanted side reactions and overall improved operating efficiencies and costs.

Thus the present invention provides an improved process for solid phase polymerizing polyamide polymer comprising the steps of:

(a) passing an oxygen free gas, wherein the gas is characterized by a dew point less than 30° C., through the interstitial space between particulate solid phase polyamide polymer, wherein the polymer contains an effective amount of a phosphorus-containing catalyst, at a temperature and for a time sufficient to sustain solid phase polymerization of said polyamide polymer at a reaction rate characterized by a catalyst factor, corresponding to the ratio of 3rd order rate constants of catalyst-containing polymer divided by uncatalyzed polymer, of greater than 1.2; and (b) recovering polyamide polymer of increased molecular weight.

The present invention further provides in one specific embodiment of the above process a continuous commercial process wherein the particulate solid phase polyamide polymer is introduced to the top of a solid phase polymerization vessel and removed at the bottom and simultaneously the oxygen free gas phase is introduced to the bottom of said vessel and removed from the top and further comprising the steps of:

(a) passing at least a portion of the oxygen free gas phase removed from said vessel through a desiccant such as to lower the dew point-to a value of −30° C. or below; and (b) recycling the low dew point gas produced in step (a) to the bottom of the solid phase polymerization vessel.

In another related embodiment the particulate solid phase polyamide polymer is further subjected to radio frequency drying prior to introducing the polymer to the top of a solid phase polymerization vessel.

It is a primary object of the present invention to provide a process for solid phase polymerization of polyamide polymer resin at commercial scale that exhibits significantly improved chemical kinetics relative to the rate of polymerization even at lower temperatures than conventionally employed. It is an associated object of the present invention to provide such a process that is particularly useful in the production of modern terpolyamide and multipolyamide polymer intended for use in colored nylon fiber manufacture. Fulfillment of these objects and the presence and fulfillment of related objects will be apparent upon complete reading of the specification and attached claims.

DESCRIPTION OF THE PREFERRED EMBODIMENTS

Figure 1:
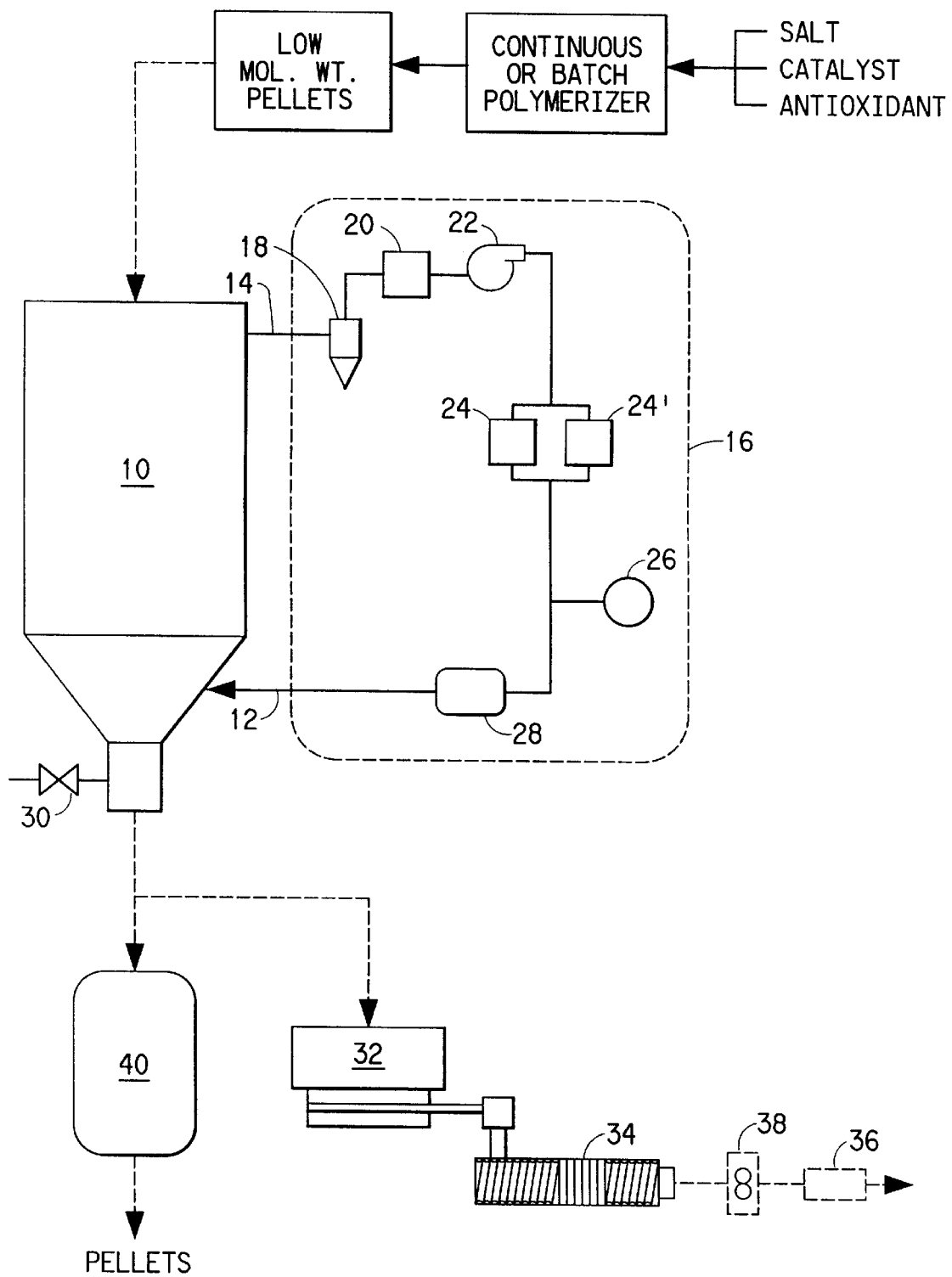
FIG. 1 illustrates one specific embodiment of the present invention wherein drying gas from the top of the SPP reactor is passed through a desiccant column to achieve very low dew point before being recycled to the bottom of the SPP reactor.

The solid phase polymerization process of the current invention comprises heating phosphorus catalyst-containing polyamide polymer pellets or the like in an oxygen-free gas at low dew point to increase the molecular weight of the polymer. It has been found that solid phase polymerization rates for phosphorus catalyst-containing polyamides at dew points less than about 30° C. are significantly higher than rates for processes run at high dew point and/or using catalyst-free polyamide. It is believed that moisture in the pellets deactivates the catalyst. The low dew point gas provides a driving force for diffusion of moisture from the interior to the surface of the polyamide pellets and evaporation of that water from the surface, increasing the activity of the catalyst. In the absence of catalyst, lowering the dew point to below 30° C. has little effect on the rate of solid phase polymerization.

As used herein, the term "amide-forming moiety" refers to the radical of a diacid, diamine, or lactam. For example, the amide-forming moieties of nylon 6,6 are $-(HN-(CH_2)_6NH-)$ derived from the monomer hexamethylene diamine, HMD, and $-(OC-(CH_2)_4CO-)$ derived from the monomer adipic acid. The term "amide unit" refers to units formed by two amide-forming moieties. For example, the amide units of 2-methyl pentamethylene diamine, MPMD, are the recurring units formed by the reaction of that diamine with an acid end-group, such as those of diacids and lactams. The term "interpolyamide" is used herein to refer to polyamides comprised of two or more different recurring amide units, thus having at least three different amide-forming moieties as part of the polymer chain. The interpolyamides can be formed by reacting a mixture of the monomeric ingredients or by co-melting two or more different polyamides. The term "copolymer" (i.e., "copolyamide") is used to describe the group of interpolyamides formed from only three different amide-forming moieties. The term "terpolymer" (i.e., "terpolyamide") refers to polyamides having only four different amide-forming moieties. The term "multipolymer" (i.e., "multipolyamide") refers to polyamides comprised of more than four different amide-forming moieties.

For simplicity, specific interpolyamides will be described herein by referring to the amide units in the polymers and the weight percent of those units in the final polymer. For example, 3% MPMD,I/1.5% 6,5-sulfoisophthalic acid/95.5% 6,6 refers to a multipolyamide in which 3 weight percent of the amide units in the final multipolyamide are derived from 2-methyl pentamethylene diamine, MPMD, and isophthalic acid, I; 1.5 weight percent of the amide units are derived from hexamethylenediamine, HMD, and 5-sulfoisophthalic acid, and 95.5 weight percent of the amide units are derived from HMD and adipic acid. Terpolymer 1.5% MPMD,I/98.5% 6,6 refers to a terpolyamide in which 1.5 wt % of the amide units in the final terpolyamide are derived from MPMD and isophthalic acid and 98.5 wt % of the amide units are derived from HMD and adipic acid.

Polyamides useful in the process of the current invention are well known in the art and include polyamides obtained by condensation of diacids and diamnines or salts thereof, polyamides which are the condensation product of lactams or aminoacids, and polyamides which are prepared by reaction of an omega-amino nitrile or mixture of a diamine and dinitrile in the presence of water.

Homopolyamides obtained from the condensation of a single diamine and a single diacid and interpolyamides obtained by condensation of a mixture of two or more diamines with one or more diacids or a mixture of two or more diacids with one or more diamines can be used. Suitable monomers include aliphatic, alicyclic, and aromatic diamines having 4–16 carbon atoms and aliphatic, alicyclic, and aromatic dicarboxylic acids having 4–16 carbon atoms. Mixtures of two or more polyamides can also be used. Preferred diacids include adipic acid, sebacic acid, suberic acid, dodecanedioic acid, azelaic acid, terephthalic acid, isophthalic acid, and 5-sulfoisophthalic acid. Preferred diamines include hexamethylene diamine, tetramethylene diamine, pentamethylene diamine, and 2-methyl pentamethylene diamine.

Homopolyamides or interpolyamides formed by reaction of aminocarboxylic acids or the corresponding lactams or interpolyamides thereof with diamines and diacids can also be used. Preferred are aminocarboxylic acids or the corresponding lactams having 6–12 carbons including caprolactam, laurolactam, enantholactam, omega-aminoundecanoic acid, and aminododecanoic acid.

Preferred polyamides are poly(hexamethylene adipamide), nylon 6,6, polycaprolactam, nylon 6, and interpolyamides thereof containing less than about 15 wt % comonomers. The process of the current invention is especially useful for solid phase polymerization of interpolyamides, including copolyamides, terpolyamides and multipolyamides which generally solid phase polymerize with slower kinetics than the corresponding homopolymers. The polyamides can optionally include additives such as plasticizers, delusterants, pigments, dyes, antioxidants, antistatic agents, and the like as generally known in the art.

The polyamides can be prepared using batch or continuous methods known in the art. A typical example of a batch process is a two stage process. In the first stage, one or more aqueous salt solutions are charged into an evaporator. The desired additives, including the phosphorus catalyst, are conveniently added simultaneously with the salt solutions or sequentially during the first stage. Alternatively, some or all of the additives can be charged during the second stage.

The reaction mixture is heated to the boil under slight pressure in an inert atmosphere to remove excess water. A slight pressure is desirable to minimize the loss of volatile materials such as hexamethylenediamine. Upon reaching a concentration in the range of 10 to 30 weight percent water, the reaction mixture is transferred to an autoclave for the second stage of the process. It is at this point that some or all of the additives that are needed in the final product may alternatively be added. The reaction mixture is maintained under an oxygen-free atmosphere to avoid undesirable side reactions such as oxidative degradation. The reaction mixture is heated to a temperature between 175 and 200° C., while increasing pressure to about 300 psia to minimize loss of volatile organic compounds. The temperature is then increased to 250 to 275° C. and the pressure released at a slow rate to bleed off steam and to drive the condensation reaction towards polymerization. While maintaining approximately the same temperature, the reaction mixture is held at a low constant pressure for a sufficient time to obtain the desired extent of the reaction. The polyamide is then extruded from the reaction vessel, for example in the form of a strand, and cut into pellets. Most conventional sizes and shapes of molding pellets are suitable for use in the current invention. For example, pellets in the shape of right cylinders having dimensions of approximately 90×90, mils (2.3× 2.3 mm) are convenient. Preferably the smallest dimension is not greater than about 0.125 in (3.175 mm) to ensure uniform polymerization throughout the pellet. However, smaller particle sizes may be used. Thus it should be appreciated that the solid phase polyamide can be shaped and recovered in other particulate forms than pellets and all such particulate forms are amenable to the improved solid phase polymerization process of the instant invention.

The starting polyamide material can be of any convenient molecular weight. The starting polyamide preferably has a number average molecular weight between about 2,000 and 20,000. Starting molecular weights of from 10,000 to 18,000 are convenient. Higher molecular weights may be used, depending on the end use.

Solid state polymerization catalysts suitable for use in the current invention are oxygen-containing phosphorus compounds including those described in Curatolo et al., U.S. Pat. No. 4,568,736 such as phosphorous acid; phosphonic acid; alkyl and aryl substituted phosphonic acids; hypophosphorous acid; alkyl, aryl and alkyl/aryl substituted phosphinic acids; phosphoric acid; as well as the alkyl, aryl and alkyl/ aryl esters, metal salts, ammonium salts and ammonium alkyl salts of these various phosphorus containing acids. Examples of suitable catalysts include $X(CH_2)_nPO_3R_2$, wherein X is selected from 2-pyridyl, $—NH_2$, NHR', and $N(R')_2$, n=2 to 5, R and R' independently are H or alkyl; 2-aminoethylphosphonic acid, potassium tolylphosphinate, and phenylphosphinic acid. Preferred catalysts include 2-(2'-pyridyl) ethyl phosphonic acid, PEPA, and metal hypophosphite salts including sodium and manganous hypophosphite. It may be advantageous to add a base such as an alkali metal bicarbonate with the catalyst to minimize thermal degradation, as described in Buzinkai et al., U.S. Pat. No. 5,116,919.

Generally the catalyst is added in an amounts from about 0.5 up to about 5 moles per million grams, mpmg, of polyamide (typically about 15.5 to 155 ppm based on polyamide). This range provides commercially useful rates of solid phase polymerization under the conditions of the current invention, while minimizing deleterious effects which can occur when catalyst is used at higher levels, for example pack pressure rise during subsequent spinning.

For effective solid phase polymerization, it is necessary for the catalyst to be thoroughly dispersed in the polyamide pellets. A particularly convenient method for adding the phosphorus catalyst is to provide the catalyst in a solution of polymer ingredients in which polymerization is initiated, e.g., by addition to a salt solution such as the hexamethylene-diammonium adipate solution used to make nylon 6,6 as described above. Alternately, the catalyst can be introduced into the polymer melt such as by injection into a low RV polymer melt prior to pelletizing.

The starting phosphorus catalyst-containing polyamide pellets are heated in solid phase polymerization vessel assembly in a substantially oxygen-free gas such as nitrogen, argon, or helium. The preferred gas is nitrogen. Atmospheres containing other gases, for example nitrogen containing low levels of carbon dioxide, can also be used. The gas is generally heated to provide the thermal energy to heat the pellets or particulate polyamide polymer. For purposes of the present invention, the term oxygen free gas refers to a gas containing at most 5,000 ppm oxygen when intended for use at temperatures of the order of 110° C. down to containing less than 500 ppm oxygen for applications approaching 190° C. and containing as low as a few hundred ppm oxygen for some applications highly sensitive to oxidation.

The dew point of the feed gas must be less than about 30° C. Dew points of 30 to –100° C. are particularly useful, preferably –10 to –80° C., more preferably –10 to –50° C. At dew points much lower than about –50° C., the cost of drying increases substantially relative to the additional benefit achieved by further lowering of the dew point. The feed gas can be dried to achieve the desired dew point such as by passing the gas through an absorbent such as Linde molecular sieves or through a desiccant such as phosphorus pentoxide or the like.

The catalyst-containing polyamide pellets are heated while circulating the low dew point gas through the pellet bed for a period of time sufficient to achieve the desired increase in molecular weight. Generally, molecular weights after solid phase polymerization of 14,000 to 22,000 are useful for fiber-forming applications. Solid phase polymerization temperatures between 120 and 200° C. are generally useful, preferably 120 to 200° C., most preferably 140 to 170° C. At temperatures below about 120° C., the catalyst continues to provide an increase in solid phase polymerization rate versus catalyst-free polymer under low dew point conditions, however the residence time required at lower temperatures are long and require the use of undesirably large solid phase polymerization vessels. Temperatures greater than 200° C. can result in thermal degradation and agglomeration of the pellets. The rate of solid phase polymerization at low dew point in the presence of phosphorous catalysts increases significantly at temperatures above 160° C. However, temperatures below 170° C. are preferred to reduce evolution of oligomers and loss of volatile additives from the pellets. For example, in nylon 6,6 increasing amounts of fine dust are formed from condensing volatile oligomers which are evolved from the pellets at temperatures greater than about 170° C. Temperatures above 170° C. are useful when it is desirable to complete the solid phase polymerization as rapidly as possible.

The synergistic effect of catalyst and low dew point results in significantly increased rates of solid phase polymerization versus processes which are run at high dew points or in the absence of catalyst. A convenient quantitative measure of the effect of catalyst is the catalyst factor, defined herein as the numerical ratio of the 3rd order rate constant associated with the rate of solid phase polymerization of catalyst-containing polymer divided by the 3rd order rate constant associated with the rate for catalyst-free polymer. Preferably, solid phase polymerization conditions and catalyst concentrations are selected such that catalyst factors of greater than 1.2 are achieved. This results in at least a 20% reduction in residence time required to achieve the same increase in molecular weight when catalyst is used. Generally, catalyst factors of close to one are obtained for solid phase polymerization processes conducted at high dew point.

The process of the current invention also allows lower solid phase polymerization temperatures to be used at approximately the same residence time compared to conventional processes. Residence times of about 0.5 to about 36 hours are useful with longer times required at lower temperatures. At temperatures of 140–170° C., residence times of about 2 to 8 hours are preferred.

The solid-phase polymerization process of the current invention can be carried out in continuous or batch mode. One specific embodiment of a preferred continuous process is illustrated in FIG. 1. As shown schematically at the top of FIG. 1, low molecular weight phosphorus catalyst-containing pellets are prepared using batch or continuous polymerization and pelletization processes as generally known in the art and are fed continuously into the top of a gravity conveyed, plug flow solid phase polymerization vessel assembly 10. The pellets can be added to the assembly at room temperature or can be preheated (not shown). A substantially oxygen-free gas such as nitrogen is fed into the bottom of the vessel at 12 and is circulated upwardly through the vessel counter current to the direction of pellet flow. Gas flow is maintained low enough to preclude fluidization of the pellets. The pressure in the vessel is maintained at or slightly above atmospheric. The gas exits the vessel through line 14 at the top of the solid phase polymerization vessel 10. Preferably, the exit gas is recirculated to the vessel through a dryer system 16, such as a desiccant bed dryer set out in the figure by use of dashed lines, in order to maintain the dew point of the feed gas at the desired temperature. In FIG.

1, the dual bed desiccant dryer system 16 includes a filter 18, cooler 20, recirculating gas blower 22, two desiccant beds 24 and 24', dew point sensor 26, and gas heater 28. Filter 18 removes fine dust generally comprising volatile oligomers which have been removed from the pellets and subsequently precipitated out as the gas has cooled. Generally, filters of nominally 40 microns or less are sufficient to remove the fine powder that can be created in the process. It is important to remove the volatile oligomers before the gas passes through the desiccant beds as they can be a fire hazard during regeneration of the desiccant. The gas cooler 20 cools the gas to temperatures of below 120° C., preferably 80 to 100° C., which temperatures are generally required for molecular sieve desiccants to be effective in drying the circulating gas. Molecular sieves, for example those of sodium aluminosilicate, potassium sodium aluminosilicate and calcium sodium aluminosilicate, are suitable for use as a desiccant to dry the gas to the required dew points. Only one of the desiccant beds 24 and 24' are on-line while the other one is being regenerated. The regeneration system (not shown in FIG. 1) includes an intake air filter, blower and heater to dry the off-line desiccant bed. Molecular sieve desiccants are generally regenerated by heating above about 180° C. A microprocessor can be used to control the switching cycle of desiccant beds, typically every four hours. The humidity of the gas is monitored by a dew point sensor 26. The temperature of the gas is then raised by heater 28 to the desired temperature and recirculated back to the solid phase polymerizer 10. The flow of the circulating gas is maintained approximately constant by blower 22. The solid phase polymerized, high molecular weight pellets can be withdrawn periodically from a sample port 30. The pellets are generally withdrawn from the bottom of the vessel at the same rate that pellets are fed into the top to maintain the pellet bed height in the vessel constant. The solid phase polymerizer may be coupled to a pellet feeder 32, for example a gravimetric feeder, fed into a melt extruder 34 and pumped to a spinning machine or compounding facility indicated by 36 using a melt pump 38. Colorants or other additives can be added in the extruder. Alternatively, the high molecular weight pellets can be fed from the solid phase polymerizer 10 to a pellet cooler 40 and packaged as resin for molding applications or remelting for fiber or compounded resin at a later time.

To further accelerate solid phase Polymerization, the pellets may be dried prior to being fed into the solid phase polymerization vessel. Conventional circulating hot gas dryers or microwave radiation may be used to dry the pellets. A Preferred method for quickly drying polyamide resin pellets is by the use of a high frequency electric field, as described in Lowe U.S. Pat. No. 5,237,755. Pellets can generally be dried at low temperatures in less than 15 minutes using high frequency electric fields, with no increase in yellowness. The drying of polyamide pellets using this method is accomplished by placing the pellets between at least two electrodes, arranging the electrodes and applying a high frequency voltage to those electrodes so that the heating rate of the polyamide resin is preferably between 0.5° C./minute and 50° C./minute, more preferably between 0.5° C./minute and 25° C./minute, most preferably between 2° C./minute and 10° C./minute, and withdrawing the water evolved from the space around the pellets. The pellets may be preheated prior to RF drying, in which case drying can be accomplished by applying voltage to the electrodes so that the heating rate is less than 0.5° C./minute to maintain the polymer at the desired temperature. RF drying may be conducted in an oxygen-free gas such as nitrogen, carbon dioxide, or mixtures thereof. Oxygen-containing gases such as air can also be used so long as the temperature of the pellets during RF drying is maintained less than about 90° C. to minimize oxidation. Preferably the dew point of the gas is maintained at −10 to −40° C. during RF drying. The frequency of the electric field should preferably be between 0.8 and 200 MHz, more preferably between 10 and 100 MHz, and most preferably between 10 and 70 MHz. The high frequency voltage can be applied to the electrodes in a continuous fashion or can be pulsed on and off or varied in voltage and/or frequency.

Figure 2:
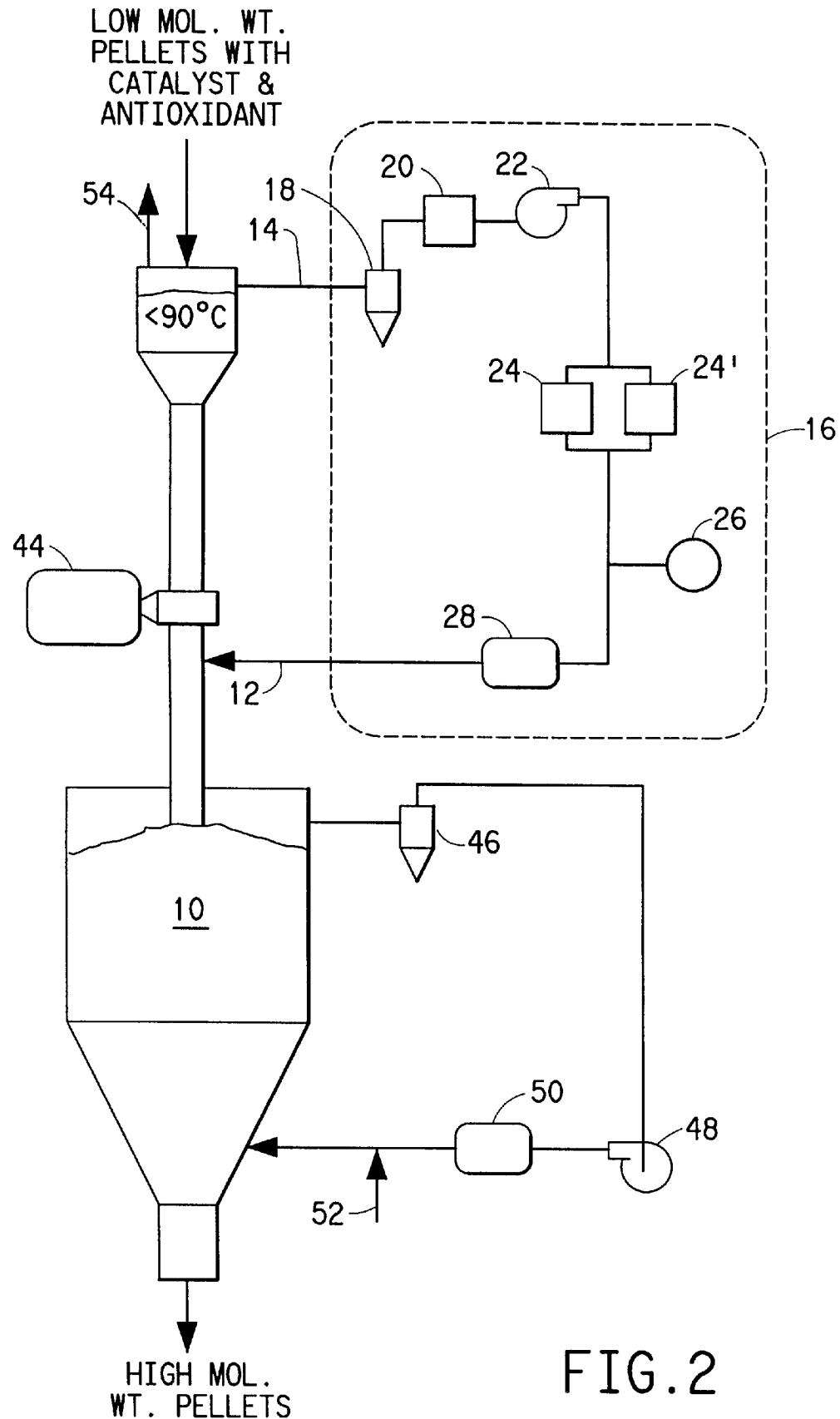
FIG. 2 illustrates an alternate embodiment of the invention wherein the polyamide polymer pellets are subjected to radio frequency drying prior to entering the SPP reactor.

An example of high frequency drying used in the current process is shown in FIG. 2. In this alternate embodiment again of a continuous process is being illustrated wherein the desiccant bed dryer system 16 is identical to that described for FIG. 1 and as such the identical numeral are used where appropriate. However, in the specific embodiment of FIG. 2 the desiccant bed dryer system 16 is coupled to a hopper 42 wherein circulating gas is used for removing surface moisture from the pellets while moisture from the interior of the pellets is brought to the surface by a radio frequency, RF, generator 44. If the circulating gas contains oxygen, it is necessary that the pellets be maintained at less than 90° C. during RF drying. It is desirable that the pellets contain an antioxidant in addition to the phosphorus catalyst, especially if air is used in the RF drying step. Moisture in the pellets can be reduced from 0.5 to 0.005 wt % in less than 10 minutes. The dry pellets are then transferred to solid phase polymerizer 10 where dry oxygen-free gas is used to strip oxygen out and heat the pellets to 100 to 160° C. and rapidly solid phase polymerize to high molecular weight. It is not necessary to dry the gas that is recirculated through the solid phase polymerizer when the moisture in the incoming pellets has been reduced to less than about 0.005 to about 0.01 wt % in the RF heating step. The gas which is removed at the top of the solid phase polymerizer for recirculation is passed through a filter 46 to remove any dust, such as that formed by precipitated oligomers which have volatilized from the pellets in the solid phase polymerizer 10. A blower 48 circulates the gas through heater 50 and into the bottom of the solid phase polymerizer 10. Oxygen-free gas having a dew point of −10 to −40° C. is added to the circulating gas at 52 to maintain a constant purge through the top of hopper 42 at 54. Moisture generated from RF drying is also vented at 54. The overall processing time to achieve the desired increase in molecular weight can be reduced to less than 2 hours, generally 0.5 to 2 hours, using a RF drying step prior to solid phase polymerization. In the embodiment shown in FIG. 1, much of the residence time in the upper portion of the solid phase polymerization vessel 10 is spent removing the moisture from the pellets, with most of the solid phase polymerization occurring in the bottom portion of the vessel 10. Predrying the pellets using RF heating allows smaller solid phase polymerization vessels to be used as there is little drying which occurs in the solid phase polymerization vessel.

Figure 3:
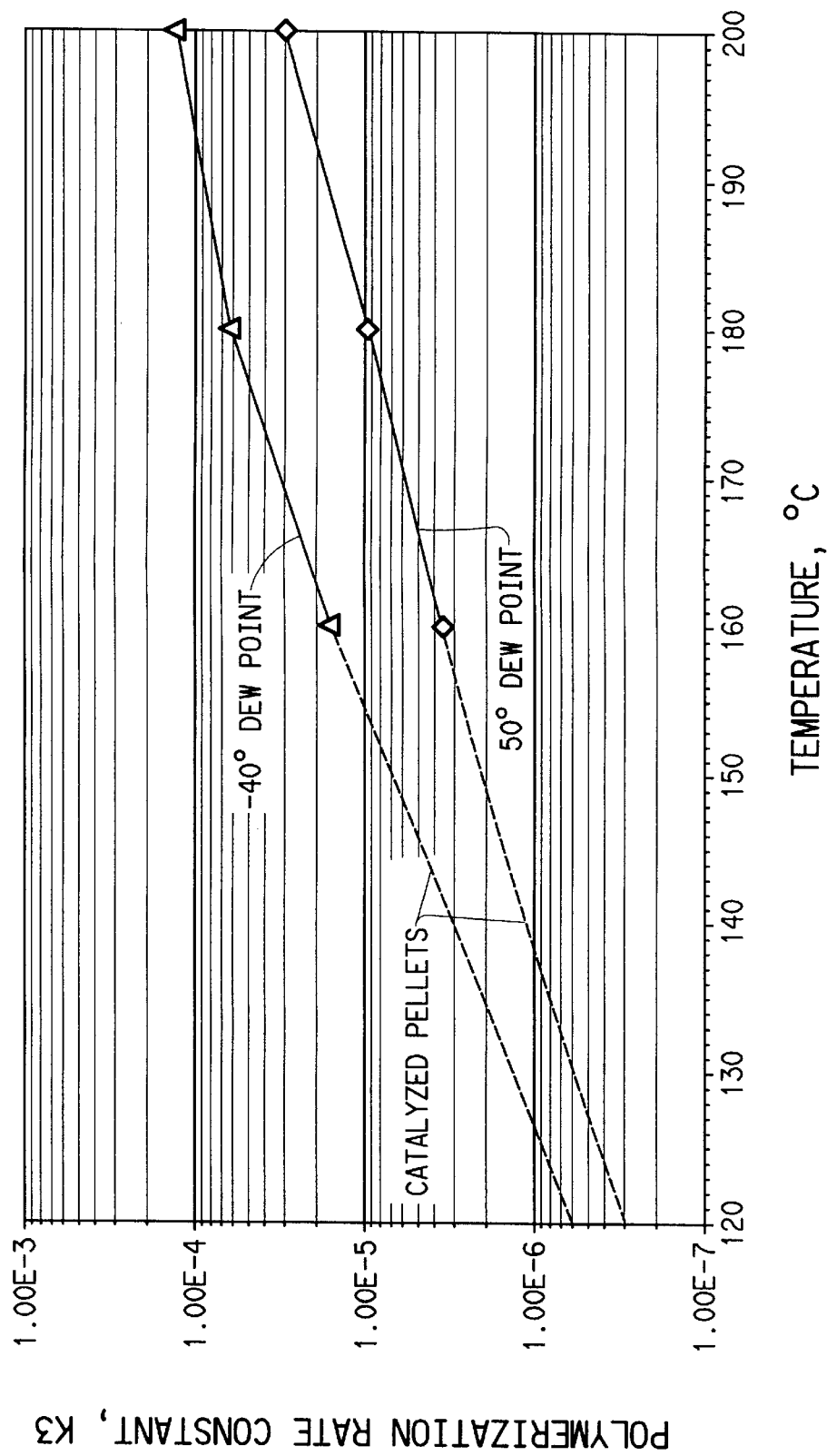
FIG. 3 is a plot of the 3rd order polymerization rate constant, K3, as a function of temperature for catalyzed polyamide polymer pellets when using high and low dew point drying gas.
Figure 4:
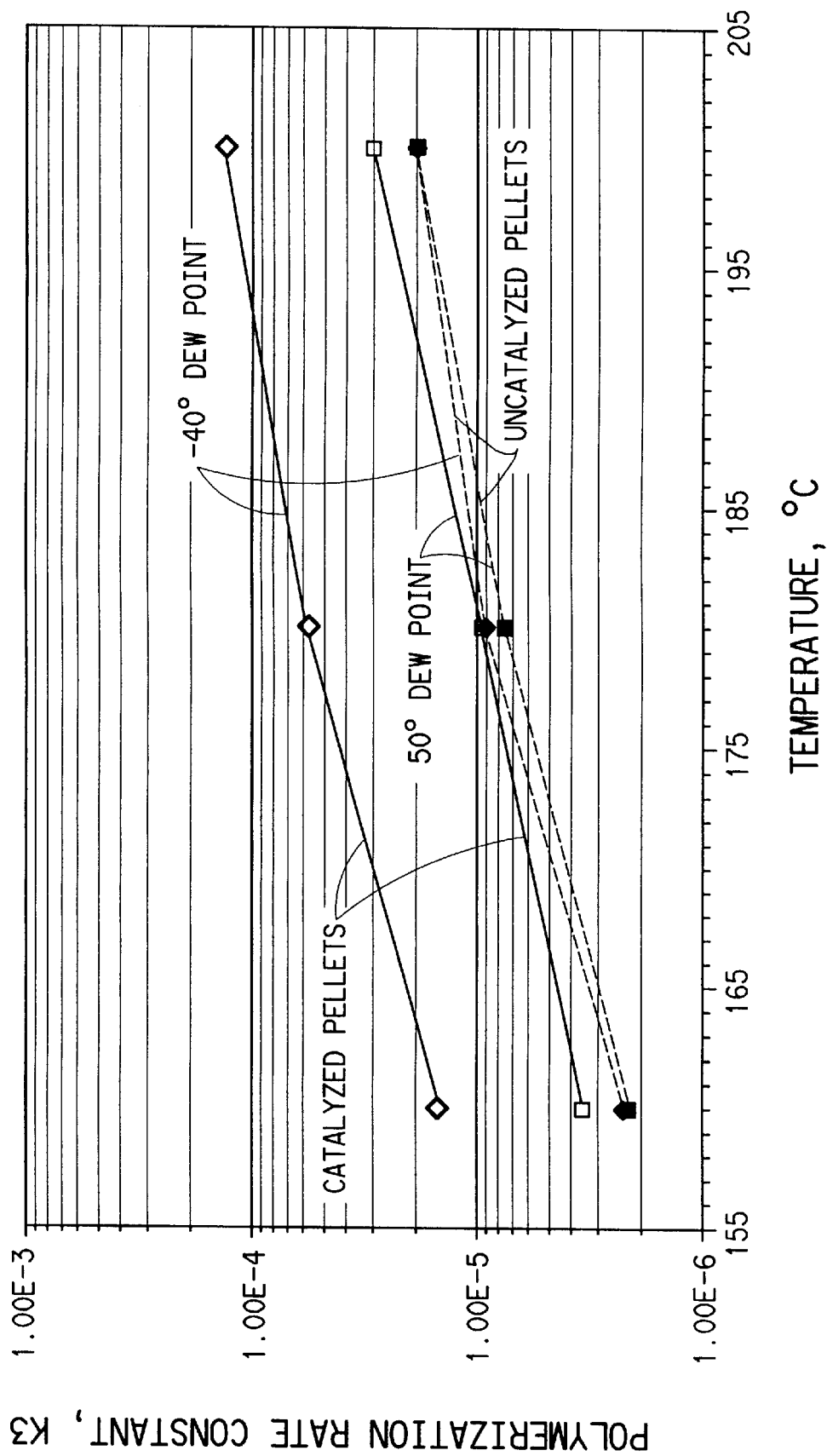
FIG. 4 is a plot of the 3rd order polymerization rate constant, K3, as a function of temperature for uncatalyzed as well as catalyzed polyamide polymer pellets when using high and low dew point drying gas for each.

FIG. 3 illustrates the typically observed differences between the third order rate constants, K3, for catalyzed pellets using conventional 50° C. dew Point drying gas versus −40° C. dew point gas at measured temperatures and as extrapolated to lower temperatures. Clearly the logarithmic vertical axis and the spacing between the plotted curves establish a significant kinetic rate of reaction advantage associated with the simultaneous use of very low dew point gas in combination with phosphorus-containing catalyst pellets. FIG. 4 further illustrates similar measured rate constants as a function of temperature for uncatalyzed pellets again with and without low dew point drying gas. Again a synergistic effect of the upper curve supports the advantage of the simultaneous use of both low dew point gas and phosphorus-containing catalyst. Clearly the individual effects of low dew point and the presence of catalyst are minor compared to the simultaneous effect of both.

The following examples are presented to more fully demonstrate and further illustrate various individual aspects and features of the present invention while the comparative examples and showings are intended to further illustrate the differences and advantages of the present invention. As such the examples are felt to be non-limiting and are meant to illustrate the invention but are not meant to be unduly limiting in any way.

Examples 1 to 7 were run according to the following procedure. The starting polymers were cryogenically ground using a Wiley Laboratory Mill Model 4 and sieved to pass through a 10 mesh screen and be retained on a 20 mesh screen. This provided consistent particle size for each run (0.084 to 0.198 cm). The polymer was dried at 80° C. for 5 hours under vacuum. A stainless steel cylindrical reactor measuring 4.1 cm in diameter and 12.7 cm in length was loaded with 70 grams of polyamide and pressure tested for leaks. The reactor was then pressurized to 30 psig with dry nitrogen and released three times as an initial air purge. The reactor was generally purged overnight at an ambient temperature with dry nitrogen flowing at 300 cc/min.

At the start of the run the reactor was lowered into a heated sand bath. Dry nitrogen flow through the reactor was maintained at 300 cc/min (measured at ambient temperature) at a pressure of 5 psig. Nitrogen gas was passed through a Supelco Carrier Gas Purifier to remove water and oxygen. The dew point of this gas was −40° C. or less. If a humidified atmosphere was used, liquid water was metered into the gas stream using a Hewlett Packard Series 1050 pump. The gas was humidified by mixing hot nitrogen and liquid water in the appropriate ratio. A humidity probe (Vaisala Model 235 Humidity Probe) verified that the dew point of the gas was accurate and constant. The reactor remained in the sand bath for a set amount of time (2 to 5 hours). It required one hour for the contents of the reactor to reach the temperature of the sand bath, therefore the times reported in the Examples are the time at temperature after the one hour heat up. When specified reaction times were ended, the water flow was stopped and the gas exit line from the reactor was closed. The reactor was removed from the sand bath and immersed in dry ice. During cooling the reactor was pressurized to 20 psig with nitrogen. The contents of the reactor cooled from 180° C. to less than 135° C. in 5 minutes. The polymer was analyzed for amine and acid ends by the methods described on pages 293 and 294 in volume 17 of the "Encyclopedia of Industrial Chemical Analysis" published by John Wiley & Sons, Inc. in 1973. The number average molecular weights, Mn, reported in the examples below were calculated from the sum of the amine and acid ends. Third order rate constants were calculated using the method described on pages 40 and 41 in "Nylon Plastics Handbook" edited by M. I. Kohan and published by Hanser/Gardner Publications, Inc. in 1995. Rate constants reported in the tables below have been multiplied by 100,000. The rate constants are especially useful in comparing solid phase polymerization rates for examples where the starting molecular weights of the catalyst-free and catalyst-containing polymers are significantly different. The catalyst factor is calculated by dividing the rate constant for polymer with catalyst by the rate constant for polymer without catalyst. In these examples, dry dew point indicates a dew point of −40° C. or less. Samples prepared according to the process of the current invention are indicated by numerical values. Control sample numbers are indicated by letters, with catalyst-containing samples run at high dew point indicated with a prime.

EXAMPLE 1

This example demonstrates the synergistic effect of catalyst and low dew point on increasing the rate of solid phase polymerization for a nylon 6,6 multipolymer using 2(2'-pyridyl) ethyl phosphonic acid, PEPA, catalyst.

Multipolymer comprising 3% MPMD,I/1.5% 6,5-sulfoisophthalic acid/95.5% 6,6 was prepared without the addition of catalyst by polymerizing a solution of the corresponding diacid-diamine salts using known methods. The catalyst-free multipolymer had a number average molecular weight, Mn, of 11,500. Catalyst-containing multipolymer was prepared by adding PEPA catalyst during the polymerization. Multipolymer samples were prepared containing 1 mole of PEPA per million grams, mpmg, (i.e., 187 ppm) and 2 mpmg (374 ppm) PEPA catalyst, calculated based on the final weight of the multipolymer. The multipolymers containing 1 mpmg and 2 mpmg catalyst had number average molecular weights of 12,800 and 13,200, respectively.

The polymers were heated in the solid phase in nitrogen for two hours at various dew points and temperatures. Results are given in Tables IA and IB (see also FIG. 4) for 1 mpmg PEPA and 2 mpmg PEPA, respectively. These results demonstrate that the rate of solid phase polymerization of catalyst-containing polymer at dew points of −40° C. or less (Samples 1, 2, 3, 5, and 6) are significantly higher than when the same polymer is solid phase polymerized at 50° C. dew point (Samples B', E', I', K', and L'). The rate of solid phase polymerization of catalyst-free polymer is relatively unaffected by dew point and is significantly lower than the rate of solid phase polymerization of catalyst-containing polymer at low dew points. Catalyst factors for dew points of −40° C. or lower range from 3.4 to 7.0 compared to catalyst factors at a dew point of 50° C. of 0.8 to 1.4. For solid phase polymerization at 160° C. at a dew point of 29° C., a catalyst factor of 2.0 is obtained (Samples 4 and H).

TABLE IA

Solid Phase Polymerization of 3% MPMD,I/1.5% 6,5-sulfoisophthalic acid/95.5% 6,6 Multipolymer With and Without 1 mpmg PEPA Catalyst

| Sample | Catalyst | Temp (° C.) | N2 dew pt. (° C.) | Mn | Rate Constant | Catalyst Factor |
|---|---|---|---|---|---|---|
| 1 | Y | 180 | dry | 18,100 | 3.1 | 3.4 |
| A | N | 180 | dry | 13,700 | 0.91 | |
| B' | Y | 180 | 50 | 14,500 | 0.86 | 1.1 |
| C | N | 180 | 50 | 14,600 | 0.76 | |
| 2 | Y | 200 | dry | 25,100 | 9.2 | 4.4 |
| D | N | 200 | dry | 16,200 | 2.1 | |
| E' | Y | 200 | 50 | 17,600 | 2.3 | 1.09 |
| F | N | 200 | 50 | 17,600 | 2.1 | |

TABLE IB

Solid Phase Polymerization of 3% MPMD,I/1.5% 6,5-sulfoisophthalic acid/95.5% 6,6 Multipolymer With and Without 2 mpmg PEPA Catalyst

| Sample | Catalyst | Temp (° C.) | N2 dew pt. (° C/) | Mn | Rate Constant | Catalyst Factor |
|---|---|---|---|---|---|---|
| 3 | Y | 160 | dry | 16,400 | 1.6 | 7.0 |
| G | N | 160 | dry | 11,400 | 0.23 | |
| 4 | Y | 160 | 29 | 13,800 | 0.48 | 2.0 |
| H | N | 160 | 29 | 11,400 | 0.24 | |
| I' | Y | 160 | 50 | 13,600 | 0.19 | 0.8 |
| J | N | 160 | 50 | 11,800 | 0.25 | |
| 5 | Y | 180 | dry | 21,900 | 5.8 | 6.4 |
| A | N | 180 | dry | 13,700 | 0.91 | |
| K' | Y | 180 | 50 | 15,100 | 0.94 | 1.2 |
| C | N | 180 | 50 | 14,600 | 0.76 | |
| 6 | Y | 200 | dry | 30,600 | 13 | 6.2 |
| D | N | 200 | dry | 16,200 | 2.1 | |
| L' | Y | 200 | 50 | 19,700 | 3.0 | 1.4 |
| F | N | 200 | 50 | 17,600 | 2.1 | |

EXAMPLE 2

This example demonstrates the synergistic effect of catalyst and low dew point on increasing the rate of solid phase polymerization for a nylon 6,6 homopolymer containing sodium hypophosphite catalyst.

Nylon 6,6 homopolymer was prepared by polymerizing a stoichiometric salt of hexamethylene diamine and adipic acid using methods known in the art. The catalyst-free polymer had a number average molecular weight, Mn, of 17,400. Catalyst-containing homopolymer was prepared by adding 0.2 mpmg (20 ppm) sodium hypophosphite catalyst and 2.6 mpmg (220 ppm) sodium bicarbonate, calculated based on the final polymer weight, during the polymerization reaction. The catalyst-containing polymer had a Mn of 16,200.

Individual polymer samples were heated in the solid phase in nitrogen at varying dew points for periods of 1 hr and 2 hrs. Results of solid phasing at various temperatures are given in Table II. The impact of catalyst on rate constant increases with increasing solid phase polymerization temperature. At 200° C. under dry conditions, catalyst factors of 3.5–4.2 are obtained compared to catalyst factors of 1.2–1.4 at the same temperature and a dew point of 50° C. This compares with catalyst factors of 1.3 at a dew point of approximately –40° C. and 0.8 at 50° C. dew point for solid phase polymerization at 160° C. Catalyst factors of less than 1 indicate that the rate of solid phase polymerization is higher for catalyst-free polymer than catalyst-containing polymer.

TABLE II

Solid Phase Polymerization of Nylon 6,6 Homopolymer With and Without 0.2 mpmg Sodium Hypophosphite Catalyst

| Sample | Catalyst | Temp (° C.) | N2 dew pt. (° C/) | Time (hrs) | Mn | Rate Constant | Catalyst Factor |
|---|---|---|---|---|---|---|---|
| 7 | Y | 160 | dry | 4 | 19,100 | 0.76 | 1.3 |
| M | N | 160 | dry | 4 | 19,300 | 0.59 | |
| N' | Y | 160 | 50 | 4 | 18,200 | 0.53 | .80 |
| O | N | 160 | 50 | 4 | 19,290 | 0.66 | |
| 8 | Y | 180 | dry | 1 | 20,400 | 3.3 | 2.2 |
| P | N | 180 | dry | 1 | 18,300 | 1.5 | |
| Q' | Y | 180 | 50 | 1 | 18,700 | 1.9 | .95 |
| R | N | 130 | 50 | 1 | 18,600 | 2.0 | |
| 9 | Y | 180 | dry | 2 | 21,200 | 2.9 | 2.6 |
| S | N | 180 | dry | 2 | 19,900 | 1.1 | |
| T' | Y | 180 | 50 | 2 | 19,900 | 1.6 | 1.1 |
| U | N | 180 | 50 | 2 | 19,300 | 1.5 | |
| 10 | Y | 200 | dry | 1 | 24,900 | 10 | 4.2 |
| V | N | 200 | dry | 1 | 20,000 | 2.4 | |
| W' | Y | 200 | 50 | 1 | 21,600 | 5.2 | 1.4 |
| X | N | 200 | 50 | 1 | 20,200 | 3.6 | |
| 11 | Y | 200 | dry | 2 | 27,800 | 8.3 | 3.5 |
| Y | N | 200 | dry | 2 | 21,300 | 2.4 | |
| Z | Y | 200 | 50 | 2 | 23,900 | 3.6 | 1.2 |
| AA | N | 200 | 50 | 2 | 22,800 | 3.0 | |

EXAMPLE 3

This example demonstrates the synergistic effect of catalyst and low dew point on increasing the rate of solid phase polymerization for a nylon 6,6 homopolymer using 2(2'-pyridyl) ethyl phosphonic acid (PEPA) catalyst.

The catalyst-free nylon 6,6 homopolymer prepared in Example 2 having a number average molecular weight, Mn, of 17,400 was used in this example. Catalyst-containing nylon 6,6 homopolymer was prepared by adding 1 mpmg (187 ppm) PEPA catalyst, based on the final weight of the polymer, during the polymerization. The catalyst-containing homopolymer had a Mn of 14,000.

Individual polymer samples were heated in the solid phase in nitrogen at varying dew points for varying temperatures. The results are summarized in Table III. The catalyst factors for solid phase polymerization at a dew point of –40° C. or less range from 1.9 to 3.6 versus 0.9 to 1.1 at a dew point of 50° C.

TABLE III

Solid Phase Polymerization of Nylon 6,6 Homopolymer With and Without 1 mpmg PEPA Catalyst

| Sample | Catalyst | Temp (° C.) | N2 dew pt. (° C/) | Time (hrs) | Mn | Rate Constant | Catalyst Factor |
|---|---|---|---|---|---|---|---|
| 12 | Y | 160 | dry | 4 | 18,200 | 1.1 | 1.9 |
| M | N | 160 | dry | 4 | 19,300 | 0.59 | |
| BB' | Y | 160 | 50 | 4 | 16,800 | 0.58 | 0.9 |
| O | N | 160 | 50 | 4 | 19,200 | 0.66 | |
| 13 | Y | 180 | dry | 1 | 19,200 | 3.8 | 2.5 |
| P | N | 180 | dry | 1 | 18,300 | 1.5 | |
| CC' | Y | 180 | 50 | 1 | 17,300 | 1.7 | 0.9 |
| R | N | 180 | 50 | 1 | 18,600 | 2.0 | |
| 14 | Y | 180 | dry | 2 | 21,600 | 4.0 | 3.6 |
| S | N | 180 | dry | 2 | 19,900 | 1.1 | |
| DD' | Y | 180 | 50 | 2 | 18,800 | 1.6 | 1.1 |
| U | N | 180 | 50 | 2 | 19,300 | 1.5 | |

EXAMPLE 4

This example demonstrates the effect of catalyst and low dew point for nylon 6,6 homopolymer with potassium tolylphosphinate catalyst.

The catalyst-free homopolymer prepared in Example 2 and having a number average molecular weight, Mn, of 17,400 was used in this example. Catalyst-containing homopolymer was prepared by adding 5 mpmg (970 ppm) potassium tolylphosphinate based on final polymer weight during polymerization. The catalyst-containing homopolymer had a Mn of 13,300.

Individual polymer samples were heated in the solid phase at 180° C. in nitrogen at varying dew points for periods of 1 hr and 2 hrs. Results are given in Table IV. The increase in rate with potassium tolylphosphinate catalyst was less than that obtained using other catalysts which were investigated. Catalyst factors of 1.2 and 1.5 were obtained at a dew point of −40° C. or less compared with catalyst factors of 0.9 at 50° C. dew point.

TABLE IV

Solid Phase Polymerization of Nylon 6,6 Homopolymer
With and Without 5 mpmg Potassium Tolylphosphinate Catalyst

| Sample | Catalyst | Temp (° C.) | N2 dew pt. (° C.) | Time (hrs) | Mn | Rate Constant | Catalyst Factor |
|---|---|---|---|---|---|---|---|
| 17 | Y | 180 | dry | 1 | 15,700 | 1.8 | 1.2 |
| GG' | N | 180 | dry | 1 | 18,300 | 1.5 | |
| 18 | Y | 180 | 50 | 1 | 15,300 | 1.7 | 0.9 |
| HH' | N | 180 | 50 | 1 | 18,600 | 2.0 | |
| 19 | Y | 180 | dry | 2 | 16,700 | 1.6 | 1.5 |
| II' | N | 180 | dry | 2 | 19,900 | 1.1 | |
| 20 | Y | 180 | 50 | 2 | 16,100 | 1.3 | 0.9 |
| JJ' | N | 180 | 50 | 2 | 19,300 | 1.5 | |

EXAMPLE 5

This example demonstrates the increase in solid phase polymerization rate for a catalyst-containing nylon 6,6 terpolymer at low dew point.

Terpolymer comprising 1.5% MPMD,I/98.5% 6,6 containing 0.26 mpmg (47 ppm), based on final polymer weight, manganese hypophosphite (Occidental Chemical Corporation) was prepared by polymerizing the corresponding diacid-diamine salts using known methods and adding the catalyst during the polymerization. The catalyst-containing terpolymer had a Mn of 14,000.

Individual catalyst-containing terpolymer samples were solid phase polymerized at varying temperatures for 4 hrs at 46° C. dew point and under dry conditions. Catalyst-free samples were not run. Results are given in Table V and illustrate the increase in rate constant under dry conditions versus at high dew point for catalyst-containing terpolyamide. At temperatures of 180 and 200° C., the rate under dry conditions is more than twice the rate at 46° C. dew point.

TABLE V

Solid Phase Polymerization of 1.5% MPMD,I/98.25% 6,6-Terpolymer
Containing 0.26 mpmg Manganese Hypophosphite

| Sample | Catalyst | Temp (° C.) | N2 dew pt. (° C.) | Mn | Rate Constant |
|---|---|---|---|---|---|
| 17 | Y | 140 | dry | 14,600 | 0.28 |
| GG' | Y | 140 | 46 | 14,700 | 0.21 |
| 18 | Y | 160 | dry | 16,800 | 0.82 |
| HH' | Y | 160 | 46 | 16,400 | 0.56 |
| 19 | Y | 180 | dry | 24,400 | 3.7 |
| II' | Y | 180 | 46 | 19,500 | 1.6 |
| 20 | Y | 200 | dry | 41,500 | 11 |
| JJ' | Y | 200 | 46 | 27,100 | 4.0 |

EXAMPLE 6

This example demonstrates the increase in solid phase polymerization rate for a catalyst-containing nylon 6,6 terpolymer at low dew point.

Terpolymer comprising 1.75% MPMD,I/98.25% 6,6 containing 0.2 mpmg (40 ppm), based on final polymer weight, manganese hypophosphite was prepared by polymerizing the corresponding diacid-diamine salts in the presence of the catalyst using known methods. The catalyst-containing terpolymer had a Mn of 13,900.

Individual catalyst-containing terpolymer samples were solid phase polymerized at 200° C. for 4 hrs at a dew point of 50° C. and under dry conditions. Catalyst-free samples were not run. Results are given in Table VI. The rate under dry conditions is approximately 3.5 times that at a dew point of 50° C.

TABLE VI

Solid Phase Polymerization of 1.75% MPMD,I/198.25% 6,6 Terpolymer
Containing 0.2 mpmg Manganese Hypophosphite

| Sample | Catalyst | Temp (° C.) | N2 dew pt. (° C.) | Mn | Rate Constant |
|---|---|---|---|---|---|
| 21 | Y | 200 | dry | 42,600 | 16 |
| KK' | Y | 200 | 50 | 27,500 | 4.7 |

EXAMPLE 7

This example demonstrates the synergistic effect of catalyst and low dew point on the rate of solid phase polymerization for nylon 6 polymer containing sodium hypophosphite catalyst.

The catalyst-free nylon 6 used in this example was Allied Capron 8200 having a number average molecular weight, Mn of 18,300. Catalyst-containing nylon 6 having a Mn of 17,100 was prepared by the following procedure. An evaporator was charged with 20 pounds of caprolactam, 10 pounds of deionized water, 0.25 grams of sodium hypophosphite and 0.8 grams of Dow Corning B antifoam. The mixture was brought to a boil to purge oxygen from the system. At 100° C., 5 pounds of water was boiled off. The solution was flushed into a stainless steel autoclave using 5 pounds of water. The mixture was agitated at 15 rpm with a pressure controller set at 250 psig. The contents were heated to 240° C. and then the pressure was reduced to atmospheric in 90 minutes while increasing the temperature to 272° C. The batch was finished at one atmosphere and 272° C. for 30 minutes. The product was cast into water as a filament and cut into pellets.

Individual samples of the polymer were heated at 180° C. for 1 hour at 50° C. dew point and under dry conditions. Results are given in Table VII and illustrate the increased effect of catalyst under dry conditions versus at 50° C. dew point.

TABLE VII

Solid Phase Polymerization of Nylon 6 With and Without
Sodium Hypophosphite Catalyst

| Sample | Catalyst | Temp (° C.) | N2 dew pt. (° C.) | Mn | Rate Constant | |
|---|---|---|---|---|---|---|
| 22 | Y | 180 | dry | 19,400 | 4.2 | 2.6 |
| LL | N | 180 | dry | 19,600 | 1.6 | |
| MM' | Y | 180 | 50 | 18,200 | 1.5 | 1.1 |
| NN | N | 180 | 50 | 19,900 | 1.4 | |

EXAMPLE 8

This example demonstrates the effect of catalyst at low dew point for nylon 6,6 homopolymer containing 0.5 mpmg PEPA catalyst that was solid phase polymerized at 120° C., which is significantly lower than traditional solid phase polymerization temperatures.

Catalyst-containing homopolymer was prepared by adding 0.5 mpmg, based on final weight of polymer, of PEPA catalyst to hexamethylene-diammonium adipate solution and polymerization of the catalyst-containing salt solution.

Catalyst-containing homopolymer pellets were solid phase polymerized at 120° C. in a gravity-fed solid phase polymerization vessel substantially as shown in FIG. 1. The pellets were fed into the top of the vessel at a rate of such that the total residence time in the solid phase polymerization vessel was 4.35 hours. Nitrogen gas was introduced into the bottom of the vessel and circulated through the vessel at a superficial velocity (velocity of gas in the absence of pellets) of approximately 1 ft/sec. The nitrogen removed from the top of the vessel was recirculated to the vessel through a dual desiccant bed dryer manufactured by Novatec. The dryer includes an internal micron filter, cooler, blower, dew point sensor, and heater, as shown in FIG. 1, as well as a regeneration system with intake air filter, blower, and heater. The desiccant beds contained molecular sieves of sodium aluminosilicate. A microprocessor controlled the switching cycle of the desiccant beds, typically every four hours. The dew point of the feed gas going into the solid phase polymerizer was maintained at −40° C. and was monitored with an aluminum oxide dew point sensor calibrated between −80 to 0° C. (Cosa Instrument Corporation). The temperature of the dried gas returning to the solid phase polymerizer was controlled at 120° C. High molecular weight pellets were withdrawn from a sample port at the bottom of the solid phase polymerization vessel for RV analysis, see Anolick et al. U.S. Pat. No. 5,543,495. Rate constants were calculated as described for Examples 1 to 7 and are reported in the Table VIII after being multiplied by 100,000. Results given in Table VIII for catalyst-free nylon 6,6 homopolymer are calculated.

TABLE VIII

| Sample | Catalyst | Inlet | Outlet RV | Delta RV | Inlet Mn | Outlet Mn | Delta Mn | Rate Mn | Catalyst Factor |
|---|---|---|---|---|---|---|---|---|---|
| 23 | Y | 42.8 | 45.3 | 2.5 | 14,557 | 15,041 | 484 | 0.16 | 1.3 |
| OO | N | 42.8* | 44.8* | 2.0* | | | 389 | 0.12 | |

*For non-catalyzed polymer:
Delta RV = $1.648 \times 10^9 \cdot e^{(-8,651/°K)} \cdot$ (Residence Time, hours)

The industrial advantages and benefits of the present invention can be viewed as being associated with and/or derived from the combination of using simultaneously a phosphorus-containing catalyst and the recycle of very low dew point drying gas at lower operating temperatures than previously employed in conducting solid phase polymerization of polyamide polymer. This combination results in lower investment costs and/or greater production capacity (i.e., lower capital investment per unit production); shorter hold-up time and/or lower reactor in production inventory (i.e., shorter residence times); and reduced evolution of cyclic oligomers and oxidative degradation. In addition to the direct economic advantage of each, the improved process of solid phase polymerization exhibits economic advantages during transition between different product grades sequentially produced in the same reactor in a commercial scale plant in that a significantly reduced amount of "off-spec" material is manufactured during the transition. The improved process is of particular value during the production of modem terpolyamide and multipolyamide polymer intended for use in colored nylon fiber manufacture.

Having thus described and exemplified the invention with a certain degree of particularity, it should be appreciated that the following claims are not to be so limited but are to be afforded a scope commensurate with the wording of each element of the claim and equivalents thereof.

We claim:

1. A method for solid phase polymerizing polyamide polymer comprising the steps of:
   (a) introducing particulate solid phase polyamide polymer to the top of a solid phase polymerization vessel and removing said particulate solid phase polyamide polymer at the bottom of a said solid phase polymerization vessel;
   (b) passing an oxygen free gas, wherein said gas has a dew point less than 30° C., through the interstitial space between said particulate solid phase polyamide polymer in said solid phase polymerization vessel by introducing said oxygen free gas phase to the bottom of said vessel and removing said gas phase at the top of said vessel, wherein said polymer contains an effective amount of a phosphorus-containing catalyst, at a temperature and for a time sufficient to sustain solid phase polymerization of said polyamide polymer at a reaction rate characterized by a catalyst factor of greater than 1.2, wherein said catalyst factor is the ratio of the 3rd order rate constant of the reaction producing said catalyst-containing polymer divided by the 3rd order rate constant of the corresponding reaction producing uncatalyzed polymer;
   (c) drying and recycling said gas phase removed at the bottom of said solid phase polymerization vessel; and
   (d) recovering polyamide polymer of increased molecular weight.

2. A method of claim 1 further comprising the steps of:
   (a) passing at least a portion of said oxygen free gas phase removed from said vessel through a desiccant to lower the dew point to a value of −30° C. or below; and
   (b) recycling the low dew point gas produced in step (a) to the bottom of said solid phase polymerization vessel.

3. A method of claim 1 further comprising the step of: subjecting said particulate solid phase polyamide polymer to radio frequency drying prior to introducing said polymer to the top of a solid phase polymerization vessel.

4. The method of claim 1, wherein the phosphorus-containing catalyst is selected from the group consisting of 2(2'-pyridyl) ethyl phosphonic acid, sodium hypophosphite, tolyl phosphinate and manganese hypophosphite.

5. The method of claim 1, wherein the polyamide polymer is selected from the group consisting of nylon 6,6, MPMD, I/6,5-sulfoisophthalic acid/6,6 multipolymer, MPMD,I/6,6 terpolymer, and nylon 6.

6. The method of claim 1, wherein the circulating oxygen free gas consists essentially of nitrogen.

* * * * *